Patented Apr. 9, 1935

1,997,545

UNITED STATES PATENT OFFICE

1,997,545

METHOD OF PURIFYING CARBOHYDRATE SOLUTIONS OBTAINED IN THE SACCHARIFICATION OF CELLULOSE-CONTAINING MATERIALS

Eduard Faerber, Heidelberg, and Hugo Koch and Helmut Urban, Mannheim-Rheinau, Germany, assignors to Holzhydrolyse, Aktiengesellschaft, Mannheim-Rheinau, Germany, a corporation of Germany No Drawing. Application May 3, 1933, Serial No. 669,194. In Germany October 31, 1931

6 Claims. (Cl. 127—37)

The present invention relates to an improved method of purifying carbohydrate solutions, particularly such as are obtained by the hydrolysis or saccharification of cellulosic or cellulose-containing materials to remove therefrom the colored organic impurities which go into solution along with the carbohydrates.

In the decomposition or hydrolysis of wood and similar vegetable materials by means of acids whether dilute acids, or concentrated acids as described for example in the Willstädter Patent No. 1,141,510 and the Hägglund Patent No. 1,544,149, there are dissolved not only the carbohydrates contained in the raw material but also certain organic materials which resemble humus substances and contaminate the carbohydrate solutions or wood sugar. The presence of these impurities may be detected by the coloring which they impart to the solution. The desirability of removing this type of impurity is, of course, manifest, but thus far no satisfactory method has been found. The use of an adsorptive carbon filter has been suggested but the removal of these impurities by means of activated carbon, for example, can be accomplished to only a slight extent and requires a large amount of adsorptive material which as a rule is fairly expensive.

We have now found that these impurities, although they exist in solution in the carbohydrate solution, can be efficiently and economically brought into insoluble form so as to be removable by filtration or other known methods of separating solid matter from liquids without at the same time subjecting the polymeric sugars to complete hydrolysis. Stated briefly, this can be accomplished by heating the solutions in the presence of a relatively large quantity of water and of a small quantity of acid. The result of such treatment is to cause the greater part of the organic impurities of the carbohydrate solutions to be converted into such an insoluble form that they can be easily removed from the solution. A curious feature of the treatment is that upon conversion of the humus-like materials into the insoluble form the sugar content of the solution in many cases increases so that it is probable that the dissolved impurities contain some sugar in combined form which is released when the state of the impurities changes from the dissolved to the insoluble form. At any rate, the source of the increase in yield of sugar is to be found in the impurities referred to.

The general process in connection with which the new method of purification of carbohydrate solutions is employed, consists in treating comminuted particles of wood or similar vegetable material preferably with strong acids, particularly mineral acids such as hydrochloric acid. The resultant liquid product is then preferably dealt with by means of steam, for example, partially for the removal and recovery of hydrochloric acid (which is returned to the first stage of the process where the wood chips are treated with concentrated hydrochloric acid) and partially to concentrate the syrup. This partially concentrated syrup is then subjected to a treatment whereby any oil which may be present is separated. The sugar syrup at this part of the process, containing approximately 60% sugar and 9% hydrochloric acid, is then passed to a stage where by heating with warm air, for example, a dry sugar containing about 90% sugar and 2% hydrochloric acid is obtained as the final product.

In the process above described the action of the hydrochloric acid on the cellulose-containing materials produces solutions which possess a reddish brown color due to the presence of undesirable accompanying substances or impurities. In effecting the removal of such impurities according to the process of the present invention, it is preferred that the initial solution be first carried through the stages where excess hydrochloric acid and the oil have been removed and where partial concentration of the sugar syrup has been incidentally effected. Thus, for example, the new process may begin at the point where the sugar syrup contains approximately 60% sugar and 9% hydrochloric acid or it may begin at a later stage of the general process, and even with the dry product of the above-described general process where it contains 90% sugar and 2% hydrochloric acid. Wherever in the general procedure the new process is applied, the first step is to add water until the solution is adjusted to a concentration of preferably less than 45% of sugar, since according to present observations and experience 45% sugar represents about the highest concentration at which the desired purification can be carried out. When the dry sugar product of the general process is used as the starting material of the purification step, it is apparent therefore that more water will have to be added than in the case where the sugar syrup is subjected to the purification process. In either case, when the desired degree of dilution has been attained, the solutions are subjected to treatment at elevated temperatures. Under some conditions a relatively low temperature suffices and in that case the heating is carried out in an open vessel. In those cases where it is desirable to heat at the boiling point, the heating takes place in a boiler provided with a reflux cooler, while in those cases where higher temperatures are used, the heating takes place in pressure vessels provided with appropriate valves. In any case, however, the heat treatment is applied until a considerable part at least of the impurities have been rendered insoluble, no complete hydrolysis of the polymeric carbohydrates taking place under the stated conditions. The acid required as an agent in the purification procedure is present in the solution due to the method of its initial production, but the proportion thereof can be readily modified by addition of neutralizers or of additional acid. When the solutions are, for example, adjusted to a concentration of about 20% sugar and 2% to 3% hydrochloric acid and then heated for about an hour at the boiling temperature, the result aimed at will be found to have been accomplished, the impurities having been converted into such an insoluble form as to be capable of ready removal from the balance of the solution.

By increasing the acid concentration the same effect can be obtained with greater sugar concentrations in a very much shorter time, for example, solutions containing 30% of sugar and 4%–5% of hydrochloric acid can be purified in this manner after but ten minutes' heating at approximately the boiling point. For solutions which contain a very small amount of acid, temperatures above the boiling temperatures may be employed, for example, a solution of 20% sugar and containing 0.5% acid can be freed of the greater part of the humus-like impurities in about one minute, the heating in this case being conducted at temperatures of the order of 130° C. To obtain the described purification the solutions are treated under considerably milder conditions or with higher sugar concentration than would be necessary for a complete hydrolysis of the sugar substances. Thus it is possible to purify a 45% sugar solution with about 1% of hydrochloric acid by heating for three hours at the boiling temperature.

The heated solutions in each of the foregoing examples possess a relatively low viscosity so that the material which has been rendered insoluble by the described treatment can be readily filtered off or separated by any convenient or known method or apparatus such as a filter press, centrifugal apparatus, or decanting vessels such as Dorr thickeners.

The improved method of purification does not cause decomposition of the sugars. For example, if a 20% sugar solution is heated as above indicated with 2%–3% hydrochloric acid for an hour at the boiling point, the solution, after purification, may show a sugar content of 20.5%–20.8%. A 30% sugar solution treated as above described with 4%–5% hydrochloric acid may show after the heat treatment a sugar content of 31%–31.5%. It will thus be seen that the purification process not only causes no material decomposition of sugar content or loss of any part of the sugar, but apparently increases the sugar concentration in the purified solution.

After separation of the impurities has been effected, the purified solution may be concentrated and the sugar contained therein reduced to dry form by any suitable method appropriate for such purposes.

It will be observed that the process described is not applied to insoluble precipitated material but is carried out in connection with a saccharification process carried to a stage where the cellulose material has been converted into water-soluble carbohydrates and it is in this sense, i. e. of initially producing and then treating as the starting material of the present process a saccharified product which is in solution, that the expression "saccharification" is used in the claims.

We claim:

1. The method of purifying solutions of carbohydrates obtained by saccharification of cellulose-containing materials with acids, which comprises converting substantial parts of organic impurities thereof into insoluble form by heating solutions of such carbohydrates and small quantities of acid for a time sufficient to cause the impurities to be converted into insoluble form but less than that required to effect complete hydrolysis of the polymeric carbohydrates, and then separating out the insolubles.

2. The method which comprises treating cellulose-containing materials with concentrated hydrochloric acid through to the stage where solubilization is substantially complete, preparing a solution of the resultant carbohydrates to contain about 45% sugar and 1 to 5% acid, then converting substantial parts of dissolved organic impurities into an insoluble form by heating the said solution of carbohydrates and small quantities of acid for a time sufficient to cause the impurities to be converted into insoluble form but less than that required to effect complete hydrolysis of the polymeric carbohydrates, and then separating out the insolubles.

3. The method which comprises treating cellulose-containing materials with concentrated hydrochloric acid through to the stage where solubilization is substantially complete, preparing a solution of the resultant carbohydrates to contain from about 20% to about 45% sugar and 1 to 5% acid, then converting substantial parts of dissolved organic impurities into an insoluble form by heating the said solution of carbohydrates and small quantities of acid for a time sufficient to cause the impurities to be converted into insoluble form but less than that required to effect complete hydrolysis of the polymeric carbohydrates, and then separating out the insolubles.

4. The method as set forth in claim 1 of purifying carbohydrate solutions obtained by saccharification of cellulose-containing materials with acids, in which the temperature applied to the solution under treatment is so co-ordinated with reference to the amount of acid present that a boiling temperature is applied with acid percentages down to 1% acid and temperatures increasingly above the boiling point are applied as the acid percentages fall below 1%.

5. The method as set forth in claim 1 of purifying carbohydrate solutions obtained by saccharification of cellulose-containing materials with acids, in which the solution under treatment is heated for some minutes only in the presence of approximately 1 to 5% acid.

6. The method as set forth in claim 1 of purifying carbohydrate solutions obtained by saccharification of cellulose-containing materials with acids, in which the solution under treatment is heated to temperatures above the boiling point in the presence of less than 1% concentrated hydrochloric acid.

EDUARD FAERBER.
HUGO KOCH.
HELMUT URBAN.